(12) United States Patent
Hwang et al.

(10) Patent No.: US 10,161,520 B2
(45) Date of Patent: Dec. 25, 2018

(54) HYDRAULIC CONTROL SYSTEM OF AUTOMATIC TRANSMISSION FOR VEHICLE PROVIDED WITH IDLE STOP AND GO SYSTEM

(71) Applicants: HYUNDAI MOTOR COMPANY, Seoul (KR); KIA MOTORS CORPORATION, Seoul (KR)

(72) Inventors: Jin Young Hwang, Yongin-Si (KR); Min Jae Chai, Suwon-si (KR); Se Hwan Jo, Bucheon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/715,888

(22) Filed: Sep. 26, 2017

(65) Prior Publication Data

US 2018/0163866 A1 Jun. 14, 2018

(30) Foreign Application Priority Data

Dec. 12, 2016 (KR) ........................ 10-2016-0168891

(51) Int. Cl.
*F16H 63/40* (2006.01)
*F16H 61/00* (2006.01)
*F16H 61/02* (2006.01)
*F16H 63/02* (2006.01)

(52) U.S. Cl.
CPC ............. *F16H 63/40* (2013.01); *F16H 61/00* (2013.01); *F16H 61/0009* (2013.01); *F16H 61/02* (2013.01); *F16H 61/0276* (2013.01); *F16H 61/0286* (2013.01); *F16H 63/02* (2013.01);
(Continued)

(58) Field of Classification Search
CPC ...... F16H 63/40; F16H 63/02; F16H 61/0286; F16H 61/0276; F16H 61/0009; F16H 2716/02; F16H 2061/0279
See application file for complete search history.

(56) References Cited

U.S. PATENT DOCUMENTS 8,454,477 B2 6/2013 Shimizu et al.
9,086,140 B2 * 7/2015 Shimizu .............. F16H 61/0021
(Continued)

FOREIGN PATENT DOCUMENTS

JP 2013015204 A 1/2013
JP 5418547 B2 2/2014
WO 2010-013556 A1 2/2010

*Primary Examiner* — David J Hlavka
(74) *Attorney, Agent, or Firm* — McDermott Will & Emery LLP

(57) ABSTRACT

A hydraulic control system of an automatic transmission for a vehicle provided with an idle stop and go (ISG) system includes a mechanical hydraulic pump driven by a torque of an engine, the mechanical hydraulic pump pumping a fluid stored in an oil pan, a regulator valve, a manual valve, a linear solenoid valve for controlling the hydraulic pressure supplied from the manual valve through the second hydraulic line and for supplying the controlled hydraulic pressure to a third hydraulic line, a switch valve, and an electric hydraulic pump driven by electric energy for pumping the fluid stored in the oil pan through a fifth hydraulic line and for feeding the pumped fluid to a sixth hydraulic line connected to the fourth hydraulic line.

5 Claims, 3 Drawing Sheets

(52) U.S. Cl.
CPC .. *F16H 2061/0279* (2013.01); *F16H 2716/02* (2013.01)

(56) References Cited

U.S. PATENT DOCUMENTS

| | | | |
|---|---|---|---|
| 2010/0193315 A1* | 8/2010 | Shimizu | F16H 61/0031 192/85.63 |
| 2011/0174107 A1* | 7/2011 | Shimizu | F16H 61/0031 74/473.11 |

* cited by examiner

HYDRAULIC CONTROL SYSTEM OF AUTOMATIC TRANSMISSION FOR VEHICLE PROVIDED WITH IDLE STOP AND GO SYSTEM

CROSS-REFERENCE TO RELATED APPLICATION

This application claims the benefit of priority to Korean Patent Application No. 10-2016-0168891, filed with the Korean Intellectual Property Office on Dec. 12, 2016, the entire contents of which are incorporated herein by reference.

TECHNICAL FIELD

The present disclosure relates to a hydraulic control system of an automatic transmission for a vehicle provided with an idle stop and go (ISG) system. More particularly, the present disclosure relates to a hydraulic control system that supplies reserve operating hydraulic pressure to a friction member operated at a gear stage where starting control is performed when an engine is stopped due to temporary stopping of the vehicle.

BACKGROUND

A vehicle provided with an ISG (Idle Stop & Go) system stops an engine when the vehicle stops and starts the vehicle when the vehicle restarts in order to reduce fuel consumption and emissions generation.

In further detail, the vehicle provided with the ISG system automatically stops the engine if idling is maintained for a predetermined time after the vehicle stops, and automatically restarts the engine if a brake pedal is released or an accelerator pedal is pushed.

Since a hydraulic pump (mechanical hydraulic pump) in an automatic transmission is not operated during an idle stop, hydraulic pressure is not generated in the automatic transmission in the vehicle provided with the ISG system.

If the hydraulic pressure is not generated in the automatic transmission, the hydraulic pressure cannot be supplied to friction members (clutches and brakes) operated at a first forward gear stage (gear stage at which starting control is performed) in a planetary gear set.

When a driver releases the brake pedal or pushes the accelerator pedal for restarting, the engine is automatically restarted and the hydraulic pump of the automatic transmission begins to operate to increase rotation speed of the drivetrain.

At this time, the hydraulic pressure in the automatic transmission rises quickly and then is supplied to the friction members, thereby achieving the first forward gear stage. Therefore, impact is applied to the vehicle, thereby causing displeasure of the driver and damage to the friction members.

In order to prevent such impact, a neutral state is temporarily achieved when restarting the engine. However, since the hydraulic pressure is supplied to the friction members for achieving the first forward gear stage after engine starting is performed at the neutral state and the hydraulic pressure is stabilized, a time delay to actually starting the vehicle may be long. Therefore, the hydraulic pressure is not, or is only partially, applied to the vehicle to achieve the neutral state only temporarily.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide a hydraulic control system of an automatic transmission for a vehicle provided with an ISG system having advantages of achieving smooth restarting after stopping an engine temporarily by continuously supplying a reserve operating hydraulic pressure to a friction member operated at a gear stage (e.g., first forward gear stage or second forward gear stage) where starting control is performed.

A hydraulic control system of an automatic transmission for a vehicle provided with an ISG system according to an exemplary embodiment of the present disclosure may be configured to supply hydraulic pressure to a friction member operated at a gear stage where starting control is performed.

The hydraulic control system may include: a mechanical hydraulic pump driven by torque of an engine to pump and feed a fluid stored in an oil pan; a regulator valve regulating operating hydraulic pressure fed from the mechanical hydraulic pump to be stable; a manual valve receiving the hydraulic pressure from the regulator valve through a first hydraulic line and supplying the hydraulic pressure to a second hydraulic line by manipulation of a shift lever; a linear solenoid valve controlling the hydraulic pressure supplied from the manual valve through the second hydraulic line and supplying the controlled hydraulic pressure to a third hydraulic line; a switch valve selectively supplying the hydraulic pressure supplied from the linear solenoid valve through the third hydraulic line to the friction member through a fourth hydraulic line; and an electric hydraulic pump driven by electric energy to pump the fluid stored in the oil pan through a fifth hydraulic line and to feed the pumped fluid to a sixth hydraulic line connected to the fourth hydraulic line.

The switch valve may be controlled by the hydraulic pressure supplied from the manual valve through the second hydraulic line.

The electric hydraulic pump may be a solenoid pump that pumps fluid by driving a piston in a cylinder by a solenoid.

A check valve for preventing backflow may be disposed on the sixth hydraulic line.

A hydraulic control system of an automatic transmission for a vehicle provided with an ISG system according to another exemplary embodiment of the present disclosure may include: a mechanical hydraulic pump driven by an engine to pump a fluid stored in an oil pan and generate hydraulic pressure; a linear solenoid valve controlling the hydraulic pressure generated by the mechanical hydraulic pump or the hydraulic pressure controlled therefrom to be an operating hydraulic pressure; a switch valve supplying or not the operating hydraulic pressure to the friction member; and an electric hydraulic pump driven by electric energy to pump the fluid stored in the oil pan and generate hydraulic pressure, and supplying the generated hydraulic pressure to the friction member, wherein the hydraulic pressure the same as the hydraulic pressure supplied to the linear solenoid valve is supplied to the switch valve as a control pressure.

The hydraulic control system may further including a check valve for preventing backflow of the hydraulic pressure from the friction member or the switch valve.

According to an exemplary embodiment of the present disclosure, since reserve operating hydraulic pressure is supplied to a friction member operated at a gear stage where starting control is performed even though an engine is stopped, smooth restart of a vehicle is possible.

In addition, a solenoid pump is used as an electric pump, weight and cost may be reduced.

In addition, mountability of the solenoid pump may be improved by enabling the solenoid pump to be mounted inside a valve body.

Further, the effects which may be obtained or predicted by the exemplary embodiment of the present disclosure will be explicitly or implicitly disclosed in the detailed description of the embodiments of the present disclosure. That is, various effects which are predicted by the exemplary embodiments of the present disclosure will be disclosed in the detailed description to be described below.

DETAILED DESCRIPTION

Figure 1:
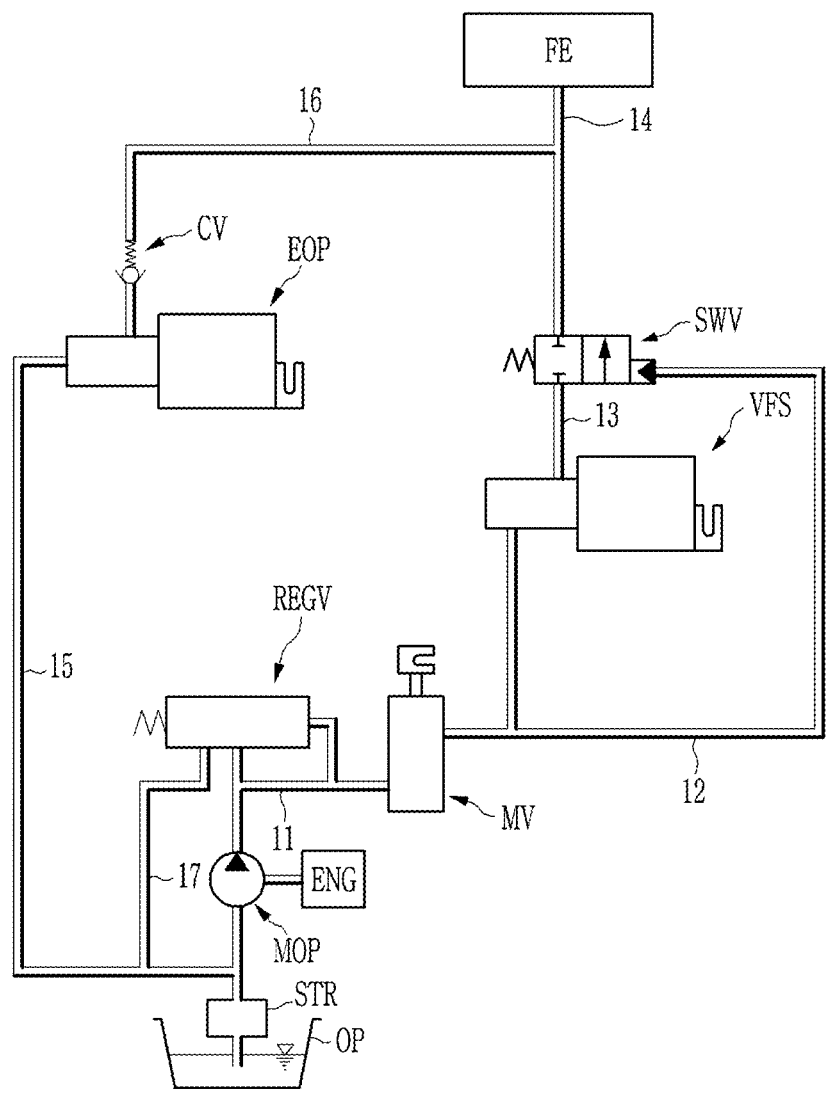
FIG. 1 is a schematic diagram of a hydraulic control system of an automatic transmission for a vehicle provided with an ISG system according to exemplary embodiments of the present disclosure, illustrating a hydraulic control system of a friction member related to a gear stage (e.g., first forward gear stage) when starting control is performed.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

To describe the present disclosure explicitly, a part which is not related to the description is omitted and like reference numerals indicate identically or functionally similar elements in the entire specification.

In the following description, dividing names of components into first, second and the like is because the names of the components are the same as each other and an order thereof is not particularly limited.

FIG. 1 is a schematic diagram of a hydraulic control system of an automatic transmission for a vehicle provided with an ISG system according to exemplary embodiments of the present disclosure, illustrating a hydraulic control system of a friction member related to a gear stage (e.g., first forward gear stage) when a starting control is performed.

Here, for ease of description, a first forward gear stage is exemplified as a gear stage where starting control is performed. The gear stage where the starting control is performed is not limited to the first forward gear stage, but may be a second forward gear stage, a reverse gear stage, etc.

Referring to FIG. 1, an automatic transmission of a vehicle provided with an ISG system includes a friction member (clutch) FE that is operated at the first forward gear stage when the starting control is performed. It is exemplified in exemplary embodiments of the present disclosure that one friction member is operated at the first forward gear state, but two or more friction members may be operated at the first forward gear stage according to some exemplary embodiments. Even though two or more friction members are operated at the first forward gear stage, a reserve operating hydraulic pressure is supplied to one friction member (clutch) FE among the two or more friction members according to exemplary embodiment of the present disclosures.

The friction member FE receive hydraulic pressure by operation of a mechanical hydraulic pump MOP driven by power of the engine when the engine ENG is driven, and receive hydraulic pressure by operation of an electric hydraulic pump EOP when the engine is stopped.

In further detail, if the mechanical hydraulic pump MOP is driven by the power of the engine ENG, the mechanical hydraulic pump MOP generates hydraulic pressure for torque converter, hydraulic pressure for shift control and hydraulic pressure for lubrication.

The hydraulic pressure generated by the mechanical hydraulic pump MOP is regulated to be a stable line pressure by a regulator valve REGV. A portion of the line pressure regulated by the regulator valve REGV is supplied through a hydraulic line (not shown) as hydraulic pressure for starting and hydraulic pressure for lubrication, and the other portion of the line pressure is supplied to a manual valve MV through a first hydraulic line 11.

The hydraulic pressure supplied to the manual valve MV is supplied to a linear solenoid valve VFS through a second hydraulic line 12 at drive D range, and the hydraulic pressure controlled by the linear solenoid valve VFS is supplied to a switch valve SWV through a third hydraulic line 13.

The hydraulic pressure supplied to the switch valve SWV is selectively supplied to the friction member FE operated when starting through a fourth hydraulic line 14 according to switching operation of the switch valve SWV.

Fluid stored in an oil pan OP can be supplied to the friction member FE through a hydraulic line other than the above-mentioned hydraulic lines. In detail, the electric hydraulic pump EOP pumps the fluid stored in the oil pan OP through a fifth hydraulic line 15 connected to an input line upstream of the mechanical hydraulic pump MOP and generates hydraulic pressure. The generated hydraulic pressure is supplied to the fourth hydraulic line 14 through a sixth hydraulic line 16. A check valve CV for preventing backflow is disposed on the sixth hydraulic line 16.

Generally, the mechanical hydraulic pump MOP is a gear pump that pumps the fluid stored in the oil pan OP through a strainer STR by the power of the engine and pressure-feeds the fluid to the regulator valve REGV. The regulator valve REGV recirculates a portion of the hydraulic pressure supplied from the first hydraulic line 11 through a recirculation hydraulic line 17 to control the hydraulic pressure to be stable, and supplies the stable hydraulic pressure to the manual valve MV.

The manual valve MV supplies the hydraulic pressure from the first hydraulic line 11 selectively through a D range output port and an R range output port according to manipulation of a shift lever, and the linear solenoid valve VFS is controlled by a transmission control device (not shown) to control the hydraulic pressure from the second hydraulic line 12 and to supply the controlled hydraulic pressure to the switch valve SWV through the third hydraulic line 13.

The switch valve SWV is controlled by the hydraulic pressure supplied through the second hydraulic line 12 to selectively supply the hydraulic pressure of the linear solenoid valve VFS supplied through the third hydraulic line 13 to the friction member FE through the fourth hydraulic line 14 as an operating hydraulic pressure thereof.

The electric hydraulic pump EOP, for example, may include an electromagnetic portion for generating an electromagnetic force by current applied to a coil, a cylinder provided with an input port and an output port, a piston being slidable in the cylinder by the electromagnetic force of the electromagnetic portion, a spring elastically supporting the piston, or biasing the piston, against the electromagnetic force, an input check valve mounted in the cylinder and preventing backflow of the fluid flowing into the input port, and an output check valve mounted in the piston and preventing backflow of the fluid discharged from the output port. The electric hydraulic pump EOP may be a solenoid pump which can pressure-feed the hydraulic pressure by reciprocating the piston by an electric signal applied to the coil.

Figure 2:
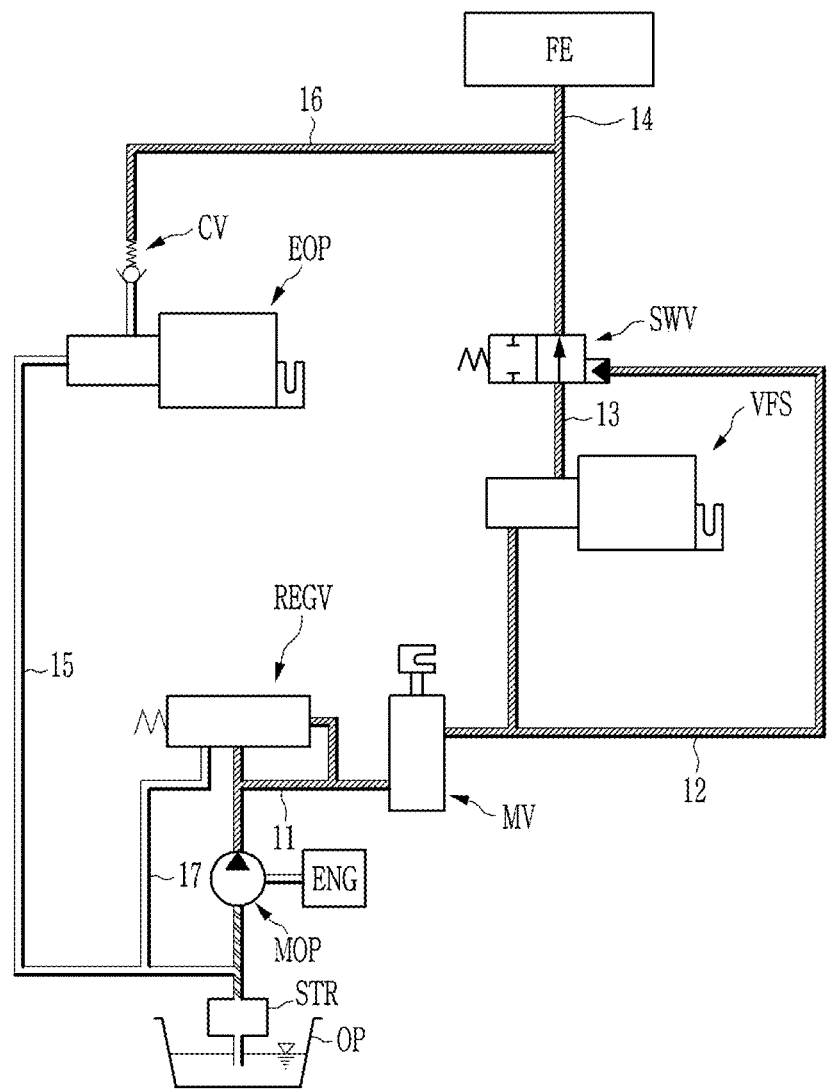
FIG. 2 illustrates a flow of hydraulic pressure to a friction member related to a gear stage (e.g., first forward gear stage) where starting control is performed when an engine begins to start in a hydraulic control system of an automatic transmission for a vehicle provided with an ISG system according to exemplary embodiments of the present disclosure.

FIG. 2 illustrates a flow of hydraulic pressure to a friction member related to a gear stage (e.g., first forward gear stage) when starting control is performed when an engine begins to start in a hydraulic control system of an automatic transmission for a vehicle provided with an ISG system according to exemplary embodiments of the present disclosure.

Referring to FIG. 2, if the engine ENG is started in a state that the manual valve MV is switched to a D range, the mechanical hydraulic pump MOP is driven to pump the fluid in the oil pan OP and pressure-feed the fluid to the regulator valve REGV through the first hydraulic line 11.

The regulator valve REGV controls the hydraulic pressure pressure-fed from the mechanical hydraulic pump MOP to be a stable line pressure and supplies the stable line pressure to the manual valve MV, and the hydraulic pressure supplied to the manual valve MV is discharged to the second hydraulic line 12 through the output port for the D range.

The hydraulic pressure supplied to the second hydraulic line 12 is supplied to the switch valve SWV as a control pressure thereof, and is controlled to be the operating hydraulic pressure of the friction member FE by the linear solenoid valve VFS. The operating hydraulic pressure is supplied to the friction member FE through the switch valve SWV and the fourth hydraulic line 14. Thereby, the vehicle starts.

At this time, the hydraulic pressure flowing from the fourth hydraulic line 14 to the sixth hydraulic line 16 is prevented from being supplied to the electric hydraulic pump EOP by the check valve CV.

Figure 3:
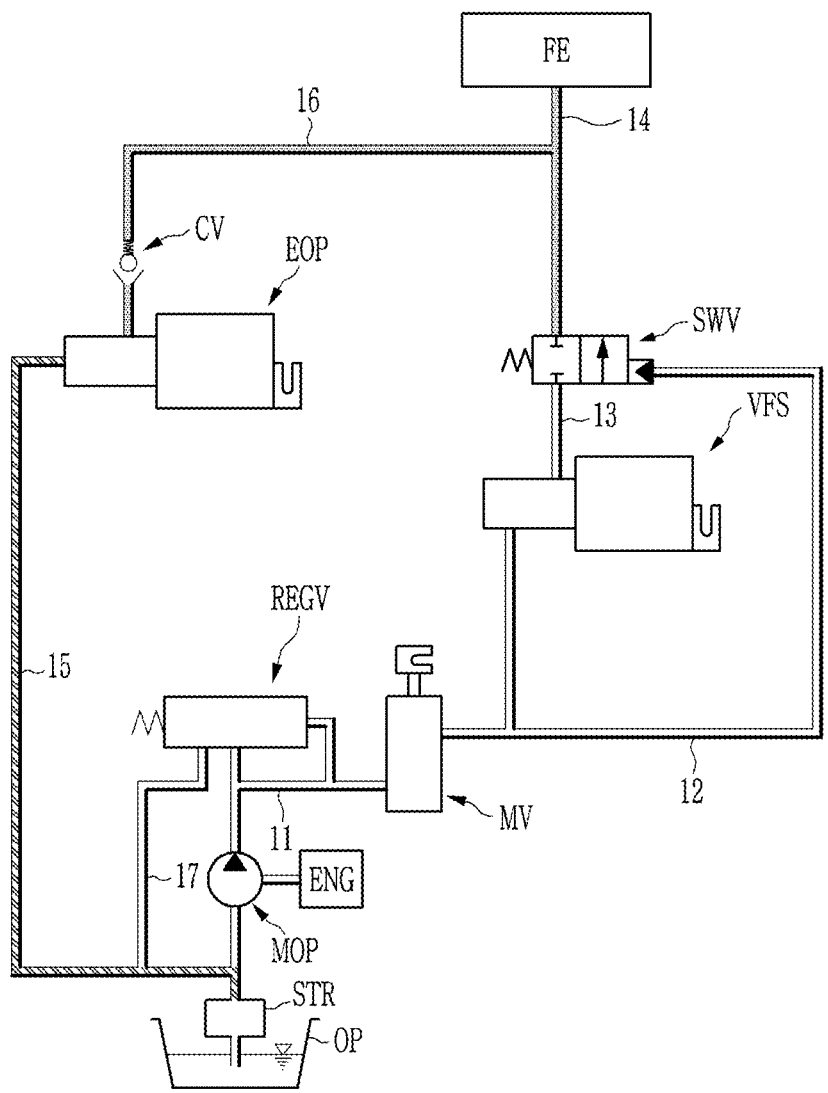
FIG. 3 illustrates a flow of hydraulic pressure to a friction member related to a gear stage (e.g., first forward gear stage) where starting control is performed when an engine is stopped in a hydraulic control system of an automatic transmission for a vehicle provided with an ISG system according to exemplary embodiments of the present disclosure.

FIG. 3 illustrates a flow of hydraulic pressure to a friction member related to a gear stage (e.g., first forward gear stage) when starting control is performed when an engine is stopped in a hydraulic control system of an automatic transmission for a vehicle provided with an ISG system according to exemplary embodiments of the present disclosure.

Referring to FIG. 3, in a case that the vehicle temporarily stops due to a traffic condition, an automatic stop conditions that vehicle speed is "0", an accelerator pedal is disposed in an off-state, a brake pedal is disposed in an on-state, and the engine ENG idling for a predetermined time are satisfied in a state that the manual valve MV is positioned at the D range. In this case, the engine ENG is automatically stopped.

If the engine ENG is stopped, the hydraulic pressure is not generated by the mechanical hydraulic pump MOP. Instead, the transmission control device operates the electric hydraulic pump EOP to pump the fluid in the oil pan OP through the fifth hydraulic line 15 and to supply the hydraulic pressure to the friction member FE through the sixth hydraulic line 16. Therefore, the reserve operating hydraulic pressure for restarting the vehicle is maintained in a hydraulic chamber of the friction member FE.

If a predetermined auto starting condition is satisfied in a state that the engine ENG is stopped, the automatically stopped engine ENG is automatically started again. At this time, the hydraulic pressure pressure-fed from the mechanical hydraulic pump MOP is supplied to the friction member FE through hydraulic lines illustrated in FIG. 2, and the supply of the hydraulic pressure by the electric hydraulic pump EOP is stopped.

The hydraulic control system of an automatic transmission for a vehicle provided with an ISG system according to exemplary embodiments of the present disclosure supplies the reserve operating hydraulic pressure to the friction member FE operated at the gear stage where the starting control is performed even though the engine ENG is stopped. Therefore, the vehicle may be restarted smoothly.

Since the solenoid pump is used as the electric hydraulic pump, vehicle weight and cost may be reduced.

In addition, mountability and/or component or engine bay packaging may be improved by enabling the solenoid pump to be mounted in a valve body.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A hydraulic control system of an automatic transmission for a vehicle provided with an idle stop and go (ISG) system, the hydraulic control system supplying hydraulic pressure to a friction member operated at a gear stage when starting control is performed, the hydraulic control system comprising:
   a mechanical hydraulic pump driven by a torque of an engine, the mechanical hydraulic pump pumping a fluid stored in an oil pan;
   a regulator valve for regulating an operating hydraulic pressure fed from the mechanical hydraulic pump to be stable;
   a manual valve for receiving the hydraulic pressure from the regulator valve through a first hydraulic line and supplying the hydraulic pressure to a second hydraulic line by manipulation of a shift lever;
   a linear solenoid valve for controlling the hydraulic pressure supplied from the manual valve through the second hydraulic line and for supplying the controlled hydraulic pressure to a third hydraulic line;
   a switch valve for selectively supplying the hydraulic pressure supplied from the linear solenoid valve through the third hydraulic line to the friction member through a fourth hydraulic line; and
   an electric hydraulic pump driven by electric energy for pumping the fluid stored in the oil pan through a fifth hydraulic line and for feeding the pumped fluid to a sixth hydraulic line connected to the fourth hydraulic line, wherein the switch valve is controlled by the hydraulic pressure supplied from the manual valve through the second hydraulic line.

2. The hydraulic control system of claim 1, wherein the electric hydraulic pump is a solenoid pump that pumps fluid by driving a piston in a cylinder by a solenoid.

3. The hydraulic control system of claim 1, wherein a check valve for preventing a backflow is disposed on the sixth hydraulic line.

4. A hydraulic control system of an automatic transmission for a vehicle provided with an idle stop and go (ISG) system, wherein the hydraulic control system supplies hydraulic pressure to a friction member operated at a gear stage when starting control is performed, the hydraulic control system comprising:

a mechanical hydraulic pump driven by an engine for pumping a fluid stored in an oil pan and generating hydraulic pressure;

a linear solenoid valve for controlling the hydraulic pressure generated by the mechanical hydraulic pump or the hydraulic pressure controlled therefrom to be an operating hydraulic pressure;

a switch valve for selectively supplying the operating hydraulic pressure to the friction member; and an electric hydraulic pump driven by electric energy for pumping the fluid stored in the oil pan and generating hydraulic pressure, and for supplying the generated hydraulic pressure to the friction member, wherein the hydraulic pressure from the electric hydraulic pump, which is equal to the hydraulic pressure supplied to the linear solenoid valve, is supplied to the switch valve as a control pressure.

5. The hydraulic control system of claim 4, further comprising a check valve for preventing a backflow of the hydraulic pressure from the friction member or the switch valve.

* * * * *